United States Patent [19]

Ito et al.

[11] Patent Number: 5,396,867
[45] Date of Patent: Mar. 14, 1995

[54] TWO-CYCLE ENGINE

[75] Inventors: Eiichi Ito; Tatsuyuki Masuda, both of Iwata, Japan

[73] Assignee: Yamaha Hatsudoki Kabushiki Kaisha, Iwata, Japan

[21] Appl. No.: 170,157

[22] Filed: Dec. 20, 1993

[30] Foreign Application Priority Data

Dec. 22, 1992 [JP] Japan .................. 4-356953

[51] Int. Cl.$^6$ ............................. F01L 1/08
[52] U.S. Cl. ..................... 123/41.39; 123/196 R
[58] Field of Search .......... 123/41.39, 196 R, 196 CP, 123/73 AD; 92/86.5, 160

[56] References Cited

U.S. PATENT DOCUMENTS

| 4,280,455 | 7/1981 | Yamaguchi et al. | 123/41.39 |
| 4,608,947 | 9/1986 | Stadler | 123/41.39 |
| 4,794,896 | 1/1989 | Tsai et al. | 123/41.39 |
| 4,829,940 | 5/1989 | Okazaki et al. | 123/41.39 |
| 4,945,864 | 8/1990 | Solomon et al. | 123/41.39 |
| 4,970,996 | 11/1990 | Matsuo et al. | 123/196 R |

Primary Examiner—Raymond A. Nelli
Assistant Examiner—Erick Solis
Attorney, Agent, or Firm—Knobbe, Martens, Olson & Bear

[57] ABSTRACT

Several embodiments of two cycle crankcase compression internal combustion engines that include an arrangement for cooling and lubricating the small end of the connecting rod, the piston pin and the head of the piston. These systems include an opening that is formed in the side or skirt of the piston and which is aligned with a corresponding opening in the cylinder during at least a portion of the stroke of the piston for delivering air and/or lubricant to the interior of the piston.

23 Claims, 4 Drawing Sheets

TWO-CYCLE ENGINE

BACKGROUND OF THE INVENTION

This invention relates to a two-cycle engine and more particularly to an improved cooling and lubricating system for such engines.

As is well known, lubricant is supplied to an engine for not only its lubrication but also for cooling purposes. With two-cycle engines this presents some difficulties. A conventional .method of lubricating two-cycle engines has required the operator to mix lubricant with the fuel that is consumed by the engine. There are, however, a number of difficulties with such arrangements, particularly in emission control and the desire to maintain a more accurate control over the amount of lubricant supplied to the engine to serve all of its running conditions. When lubricant must be mixed with the fuel, the fuel lubricant ratio must contain enough lubricant to adequately lubricate the engine under the most severe running conditions and this provides excess lubricant under most running conditions.

It has, therefore, been proposed to provide so-called "separate lubricating systems" for two-cycle engines wherein the lubricant is supplied to the engine in a manner other than mixing it with the fuel. For example, the system may be provided with an arrangement wherein lubricant is sprayed into the inducted air or is pumped directly to certain components of the engine for their lubrication. Although these systems may be satisfactory for most components, there are some instances wherein a more positive control of the lubricant supply and cooling for certain components of the engine is provided.

For example, although the big end of the connecting rod can be well lubricated by spraying lubricant into the intake charge, the small or piston pin end of the connecting rod may not receive adequate lubricant for cooling and lubrication under this method. The reason for this is that the piston pin and small end of the connecting rod are concealed within the piston and there may not be adequate air flow through this area for either cooling or lubrication.

If the big end of the connecting rod is supplied with lubricant by a pressure feed system through the crankshaft, then it is possible to drill the connecting rod with a passage that will extend up to the piston pin end for lubrication and cooling purposes. However, this method is rather expensive to employ in that it requires additional machining of the connecting rods and also may not ensure adequate cooling of the small end of the connecting rod.

It is, therefore, a principal object to this invention to provide an improved apparatus for cooling and lubricating a two-cycle crankcase compression internal combustion engine.

It is a further object of this invention to provide an improved apparatus for cooling and lubricating the small or piston pin end of a connecting rod of such engines.

SUMMARY OF THE INVENTION

The invention is adapted to be embodied in a two-cycle crankcase compression internal combustion engine that has a cylinder block which defines a cylinder bore. A crankcase chamber is formed at one end of the cylinder bore and a piston reciprocates in the cylinder bore. A connecting rod is connected at one end to the piston and another end to a crankshaft that is journalled for rotation in the crankcase chamber. The piston has an opening in its outer surface that is aligned with the one end of the connecting rod.

In accordance with an apparatus for embodying the invention, an air passage is formed within the cylinder and opens into the cylinder bore at a position which is aligned with the piston opening during at least a portion of its stroke for delivering a cooling air flow to the connecting rod one end.

In accordance with another feature of the invention, a lubricant supply opening is formed in the cylinder and opens through the cylinder bore at a position that is aligned with the piston opening during at least a portion of the stroke for delivering lubricant to the connecting rod one end.

DETAILED DESCRIPTION OF THE PREFERRED EMBODIMENTS OF THE INVENTION

Figure 1:
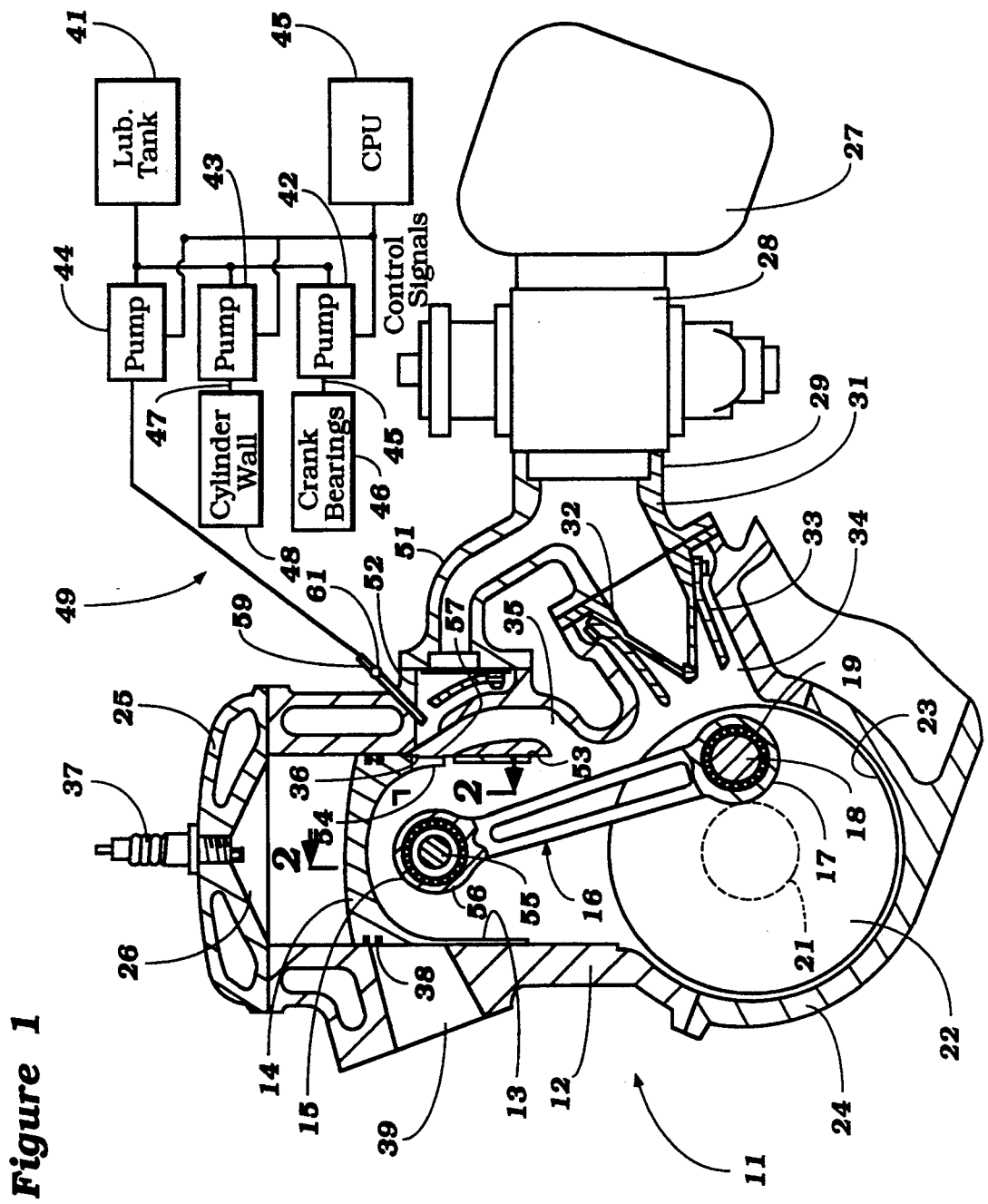
FIG. 1 is a partially schematic cross-sectional view taken through a single cylinder of a two-cycle crankcase compression internal combustion engine constructed in accordance with a first embodiment of the invention.
Figure 2:
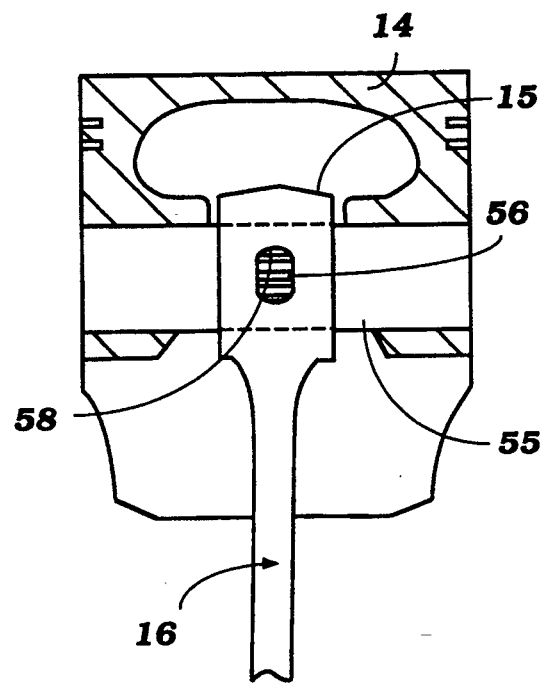
FIG. 2 is an enlarged cross-sectional view taken along the line 2—2 of FIG. 1.
Figure 3:
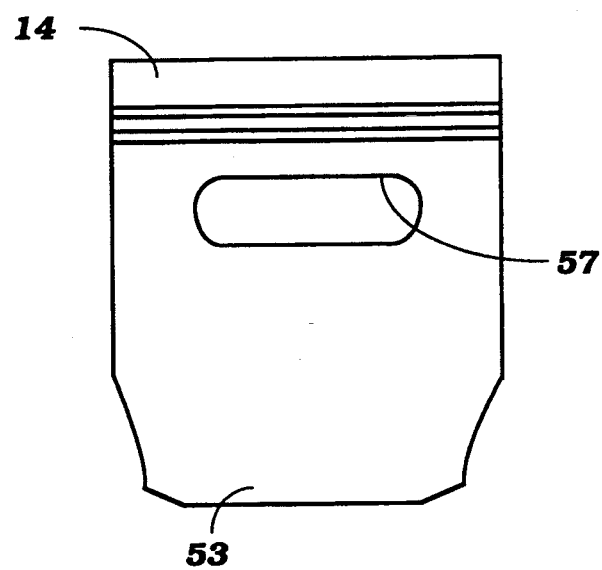
FIG. 3 is a side elevational view of the piston looking in the same direction as FIG. 2.

Referring first to the embodiment of FIGS. 1 through 3 and initially primarily to FIG. 1, a two-stroke crankcase compression internal combustion engine is identified generally by the reference numeral 11 and is shown primarily by a cross-sectional view taken through a single cylinder of the engine. It is believed that a view of only one of the cylinders will permit those skilled in the art to understand the invention and recognize that the invention may be applied to a wide variety of types of two-stroke crankcase compression internal combustion engines having varying cylinder numbers and cylinder orientations.

The engine 11 is comprised of a cylinder block 12 having at least one cylinder bore 13. A piston 14 reciprocates within the cylinder bore 13 and is connected, in a manner to be described, to the small end 15 of a connecting rod, indicated generally by the reference number 16. The construction of the piston 14 and its connection to the connecting rod small end 15 will be described later by particular reference to FIGS. 2 and 3.

A big or lower end 17 of the connecting rod 16 is journalled on a crank throw bearing portion 18 by means of a needle bearing assembly 19. The throw or crank portion 18 is connected to a main portion of a crankshaft 21 by means of a pair of disc-like side portions 22. The crankshaft 21 is rotatably journalled within a crankcase chamber 23 that is formed by the skirt of the cylinder block 12 and a crankcase member 24 that is affixed in any suitable manner to the cylinder block 12. As is well known in two-cycle crankcase compression engines, the crankcase chambers 23 associated with each cylinder bore 13 are sealed from each other and the disc-like portions 22 of the crankshaft 21 assist in this sealing operation.

A cylinder head 25 is affixed to the end of the cylinder block 12 opposite the crankcase member 24 and is formed with recesses 26 that cooperate with the heads of the pistons and the cylinder bores 13 to form the combustion chambers of the engines.

A fuel air charge is admitted to the crankcase chambers 23 by an induction system that includes an air inlet device 27 which may include an air filter and which draws atmospheric air through a suitable inlet. This air is then delivered to a charge former in the form of a carburetor 28 which, in turn, serves an intake manifold 29. The intake manifold 29 has a runner portion 31 that extends to an intake port 32 formed in the cylinder block 12 and/or crankcase member 24. A reed type check valve 33 permits the flow of air and fuel into the crankcase chambers 23 but precludes reverse flow when the piston 14 is moving downwardly to compress the charge. This charge flows from the intake port 32 into the crankcase chambers 23 through intake passages 34 formed by the crankcase member 24 and/or cylinder block 12.

The charge which is drawn into the crankcase chambers 23 through the induction system as thus far described is compressed on downward movement of the piston 14 and is eventually transferred to the combustion chambers through one or more scavenge passages 35 formed around the circumference of the cylinder bore 13. These scavenge passages 35 discharge through scavenge ports 36 formed in the cylinder 12 and opening into the cylinder bore 13.

This charge is then further compressed in the combustion chambers on the upward movement of the pistons 14 and is fired by means of a spark plug 37 mounted in the cylinder head 25 in a well known manner. The burning of the charge drives the pistons 14 downwardly and the expansion continues until an exhaust port 38 formed in the cylinder 12 and opening through the cylinder bore 13 is opened. This exhaust port 38 communicates with an exhaust passage 39 formed in the cylinder block 12 and which discharges the exhaust gases through the atmosphere through a suitable exhaust system (not shown).

The construction of the engine 11 as thus far described may be considered to be conventional and for that reason any component which has not been described in detail may be considered to be conventional. It is believed that a further description of the basic components of the engine 11 are not necessary to enable those skilled in the art how to practice the invention.

In accordance with the invention, a separate lubricating system, portions of which are shown schematically, is provided for lubricating the engine. This separate lubricating system includes a lubricant storage tank 41 from which lubricant is drawn by one or more lubricant pumps. In this specific embodiment shown, there are provided three lubricant pumps 42, 43 and 44. The use of separate lubricant pumps for each circuit of the engine to be lubricated permits the amount of lubricant to be more accurately controlled and each pump 42, 43 and 44 is driven under the control of a controller or CPU 45 which receives data from engine performance and operates the pumps 42, 43 and 44 to supply appropriate amounts of lubricant to the various components of the engine, as will be described.

The oil pump 42 outputs its oil through a conduit 45 to the crankshaft bearings 19 and the main bearings as indicated schematically at 46 in FIG. 1. Any known type of lubrication system may be employed for these bearings.

The pump 43 outputs its lubricant through a conduit 47 to the cylinder wall as indicated schematically at 48 in FIG. 1. This is a supply conduit that opens through the bore 13 in an area swept by the piston 14 so as to lubricate the piston 14 and its piston rings. Again, any known or conventional type of cylinder wall lubrication system may be employed.

In accordance with the invention, the pump 44 supplies lubricant through a conduit 49 for lubricating and cooling the small end 15 of the connecting rod 16. For this purpose, the intake manifold 31 is provided with a separate runner section 51 that communicates with a respective air flow passage 52 formed in the cylinder block 12 and which opens into the cylinder bore 13 in an area swept by a skirt 53 of the piston 14. This air passage 52 terminates at a flow opening 54 formed in the surface of the cylinder bore 13.

Referring now additionally to FIGS. 2 and 3, it will be seen that the connecting rod small end 15 is journalled to the piston 14 by means of a piston pin 55 with interposed needle bearings 56. In order to provide not only cooling air flow but lubricant to the small end 15 of the connecting rod 16, the skirt 53 of the piston 14 is provided with an elongated opening 57 that will register with the air opening 54 during at least a portion of the piston stroke.

When the piston 14 is moving upwardly and the volume of the crankcase chamber 23 is increasing, an air charge will actually be drawn through the opening 57 into the interior of the piston 14. This will not only cool the head of the piston 14 but also the small end 15 of the connecting rod 16. Furthermore, the small end 15 is provided with a further opening 58 so that air and lubricant, as will be described, can flow and impinge upon the needle bearings 56 for their cooling and lubrication.

It should be noted that the conduit 49 communicates with a feed nozzle 59 with a one-way valve 61 so as to permit lubricant to flow into the air inlet passage 52 but will preclude flow in the opposite direction when compression is occurring in the crankcase chambers. In addition, a reed type check valve 62 is provided where the manifold runner 51 serves the air passage 52 so as to permit air to be drawn in through this path but will preclude flow in the reverse direction when the piston 14 is moving downwardly to compress the charge in the crankcase chambers 23.

The air flow through the passages described will convey lubricant delivered from the pump 44 into the interior of the piston and directly on to the needle bearings 56 through the openings 57 and 58 so as to not only cool the connecting rods small end 15 and piston 14 but also so as to lubricate the bearings.

In the embodiment just described cooling air flow for the small end of the connecting rod 16 in the piston head was provided by a separate passage from the scavenge passages of the engine or its main intake passage. It is to be understood that the invention could also be employed by supplying the air for cooling through the scavenge passage of the engine. In such an event, then the lubricant discharge nozzle 59 would be positioned in the appropriate scavenge passage. However, by using a separate air flow passage, then the scavenging system need not be compromised or otherwise modified in order to practice the invention.

Figure 4:
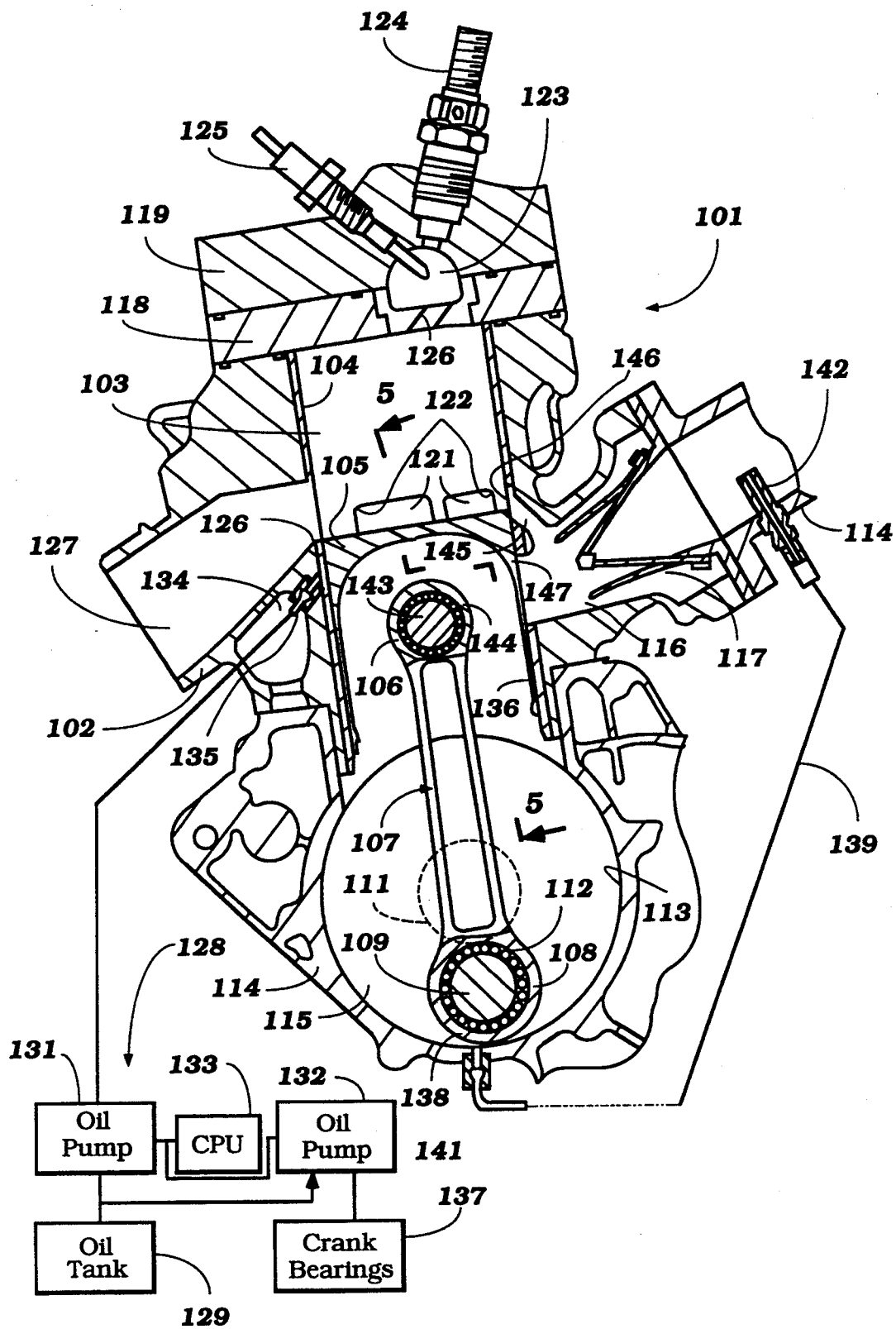
FIG. 4 is a partially schematic cross-sectional view, in part similar to FIG. 1, and shows another embodiment of the invention.
Figure 5:
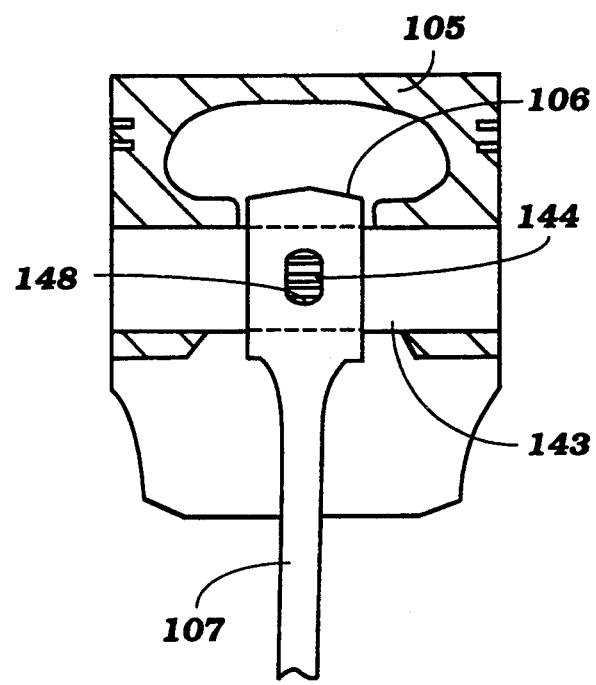
FIG. 5 is an enlarged partial cross-sectional view taken along the line 5—5 of FIG. 4.
Figure 6:
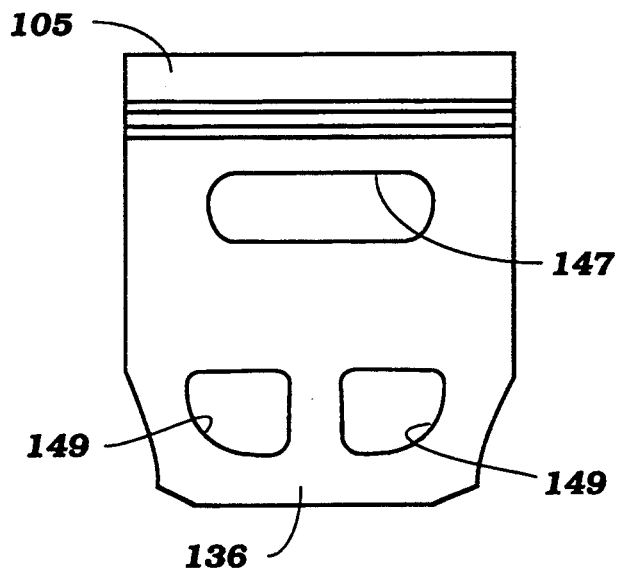
FIG. 6 is a side elevational view of the piston of this embodiment looking in the same direction as FIG. 5.

FIGS. 4 through 6 show another embodiment of the invention and in this embodiment the invention is employed in conjunction with a two-cycle, crankcase compression, diesel engine, indicated generally by the reference numeral 101. The engine 101 includes a cylinder block 102 in which one or more cylinder bores 103 are formed by pressed or cast-in liners 104.

Pistons 105 reciprocate in the cylinder bores 103 and are connected, in a manner to be described later by reference to FIGS. 5 and 6, to the small or upper ends 106 of connecting rods, indicated generally by the reference number 107. The lower or big ends 108 of the connecting rods 107 are journalled on the throws or crank journal portions 109 of a crankshaft 111 by means of needle type bearings 112.

The crankshaft 111 is rotatably journalled within a crankcase chamber 113 formed by the skirt of the cylinder block 102 and a crankcase member 114 that is connected thereto in any known manner. As is conventional with two-cycle, crankcase compression engines and as already noted, the crankcase chambers 113 are sealed from each other and disc-like portions 115 of the crankshaft 111 assist in this sealing.

An air charge is drawn into the crankcase chambers through an induction system which is comprised of an intake manifold 114 that receives an air charge from the atmosphere through any known system and delivers it to an intake passage 116 formed in the cylinder block 102. A reed type check valve 117 is provided at the inlet end of the intake passage 115 so as to permit air to flow into the crankcase chambers 113 through ioebubgs (to be described) in the pistons 105 when the pistons 105 are moving upwardly and to preclude reverse flow when these pistons 105 are moving downwardly so as to compress the charge in the crankcase chamber.

The charge so compressed is transferred to a combustion chamber formed by the heads of the piston 105 and, the cylinder bore 103 and a cylinder head assembly formed from a lower member 118 and an upper member 119 that are fixed in any suitable manner to the cylinder block 102. Scavenge passages 121 which terminate in scavenge ports 122 formed in the cylinder block 102 and cylinder liner 104 provide this transfer of charge from the crankcase chamber 113.

A pre-combustion and swirl chamber 123 is formed in the cylinder head assembly between the upper and lower members 119 and 18 and fuel is injected into this pre-chamber 123 by a fuel injector 124 in a well known manner. If desired, a glow plug 125 may be mounted in the cylinder head assembly with its tip extended into the pre-chamber 123 to assist in starting and running.

Once the charge is ignited in the pre-chamber 123 it will be discharged downwardly into the main chamber through a throat section 120 so as to initiate and propagate combustion in the cylinder bore 13 above the head of the piston 105 so as to drive the piston 105 downwardly. At an appropriate time, an exhaust port 126 which opens through the cylinder liner 104 will be opened and the exhaust gases will be discharged through an exhaust passage 127 formed in the cylinder block 102. These gases are then discharged to the atmosphere through an exhaust system (not shown). As thus far described, the engine 101 may be considered to be conventional and where any details are not shown or described, they may be of any type well known in the art.

The engine 101 is provided with a lubricating system of the separate type, which is indicated generally by the reference numeral 128. This separate lubricating system 128 includes a lubricant tank 129 that ms filled with lubricant and from which lubricant is drawn by a pair of oil pumps 131 and 132 for lubricating various portions of the engine. Again, because of the use of separate lubricant pumps for these various portions lubricated, this permits an easier and more accurate control. A controller or CPU 133 receives signals from the engine and controls the lubricant pump 131 and 132, accordingly.

The lubricant pump 131 delivers lubricant to a lubricant nozzle 134 in which a check valve 135 is provided. The nozzle 134 is disposed in the wall of the cylinder block 102 and in communication with the cylinder bore 103 through a passage formed in the liner 104 that registers with the skirt 136 of the piston 105 during at least a portion of its stroke so as to lubricate the sliding areas of the piston 105 and its piston rings.

The lubricant pump 132 delivers lubricant to the crankshaft rod bearings 112 and main bearings through a system shown schematically at 137 in FIG. 4.

In this embodiment, there is not provided a separate lubricant pump for lubricating and cooling the small end 106 of the connecting rod 107 and their bearings. However, a separate cooling and lubricating system is provided therefore and this will now be described by reference to FIGS. 5 and 6 in addition to FIG. 4.

As is well known, not only fuel but some lubricants may condense and/or collect in a lower portion 138 of the crankcase chamber 113. A drain conduit 139 in which a check valve 141 extends from this crankcase chamber portion 138 to a nozzle 142 disposed in the intake manifold 114. Hence, lubricant will also be delivered to the engine through this drain system. In order to lubricate the small end 106 of the connecting rod 107, the pistons 105 and a piston pin 143 that is journalled in the small end 106 by needle type bearings 144, and to cool this area there is provided a cooling air and lubricant flow passage 145 that branches off of the intake passage 116 and terminates in a port 146.

It has been previously noted that the intake passage 116 communicates with the crankcase chamber 113 through openings in the piston 105. These openings appear in FIGS. 4 and 6 and include an upper opening 147 that is aligned with an opening 148 in the upper or small end of the connecting rod 107 for cooling the head of the piston 105 and lubricating the piston pin 143 and bearings 144. In addition, there are provided lower openings 149 in the piston shirt 136 below the opening 147. As the piston 105 moves downwardly towards bottom dead center, the flow of charge from the crankcase chamber 113 may pass to the area above the piston outwardly through the piston opening 147, passage 145 and port 146 to enter the combustion chamber. As the piston 105 begins to move upwardly, air and lubricant will be drawn first into the interior of the piston 105 through the intake passage 116 and opening 147 and subsequently through the lower openings 149 into the crankcase chambers 113. This initial flow through the opening 147 of the piston will cause some lubrication and cooling of the small end of the connecting rod 107 and the bearings 144 and piston pin 143 through the connecting rod opening 148. As the piston 105 continues to move upwardly, the port 146 registers during a portion of the stroke of the piston 105 with the opening 147 that is aligned with the piston pin 143 so that the lubricant entrained with this air flow can impinge upon and lubricate the needle bearings 144.

It should be readily apparent from the foregoing description that the described embodiment of the invention provide adequate air flow for cooling of the piston and piston pins as well as the small end of the connecting rods and lubrication for the bearing in the small end of the connecting rod. Of course, the foregoing description is that of a preferred embodiments of the invention and various changes and modifications may be made without departing from the spirit and scope of the invention, as defined by the appended claims.

We claim:

1. A two cycle crankcase compression internal combustion engine having a cylinder block defining a cylinder bore, a crankcase chamber formed at one end of said cylinder bore, a piston reciprocating in said cylinder bore, a connecting rod connected at one end to said piston and at another end to a crankshaft journalled for rotation in said crankcase chamber, said piston having an opening in its outer surface aligned with said one end of said connecting rod, and an air passage formed within said cylinder and opening into its cylinder bore at a position aligned with said piston opening during at least a portion of the stroke of said piston for delivering a cooling air flow to said connecting rod one end.

2. The two cycle crankcase compression internal combustion engine of claim 1, wherein the piston is connected to the connecting rod one end by a piston pin.

3. The two cycle crankcase compression internal combustion engine of claim 2, wherein the connecting rod is formed with an opening aligned with the piston opening for air flow for cooling the piston pin and its bearing.

4. The two cycle crankcase compression internal combustion engine of claim 3, wherein the cylinder opening and connecting rod small end openings are disposed at a right angle to the axis of the piston pin.

5. The two cycle crankcase compression internal combustion engine of claim 2, further including means for delivering a fuel charge to the air flowing through the air passage.

6. The two cycle crankcase compression internal combustion engine of claim 1, further including an atmospheric air inlet for supplying air to the air passage.

7. The two cycle crankcase compression internal combustion engine of claim 6, wherein the air passage forms a portion of an induction system for the engine for delivering an air charge to the crankcase chamber.

8. The two cycle crankcase compression internal combustion engine of claim 7, wherein the induction system further includes charge forming means for forming a fuel/air mixture.

9. The two cycle crankcase compression internal combustion engine of claim 7, further including check valve means in the cylinder opening for permitting flow into the pistons but precluding flow from the piston into the cylinder opening.

10. The two cycle crankcase compression internal combustion engine of claim 7, further including a check valve positioned in the intake system for permitting flow from the intake system into the crankcase chamber and the piston opening and precluding flow in the opposite direction.

11. The two cycle crankcase compression internal combustion engine of claim 1, wherein the air passage is formed as a portion of a scavenge passage for delivering a charge from the crankcase chamber to the combustion chamber of the engine.

12. The two cycle crankcase compression internal combustion engine of claim 1, further including means for adding lubricant to the air flowing through the air passage.

13. The two cycle crankcase compression internal combustion engine of claim 12, wherein the means for providing lubricant comprises a separate lubricant pump for supplying lubricant directly to the air passage.

14. The two cycle crankcase compression internal combustion engine of claim 12, wherein the means for supplying lubricant comprises means for draining lubricant from the crankcase chamber and supplying it to the air passage.

15. A two cycle crankcase compression internal combustion engine having a cylinder block defining a cylinder bore, a crankcase chamber formed at one end of said cylinder bore, a piston reciprocating in said cylinder bore, a connecting rod connected to one end to said piston and at another end to a crankshaft journalled for rotation in said crankcase chamber, said piston having an opening in its outer surface aligned with said one end of said connecting rod and circumferentially spaced from the area where said piston is connected to said connecting rod, and a lubricant supply passage formed within said cylinder and opening into said cylinder bore at a position aligned with said piston opening during at least a portion of its stroke for delivering lubricant to said connecting rod one end.

16. The two cycle crankcase compression internal combustion engine of claim 15, wherein the piston is connected to the connecting rod one end by a piston pin.

17. The two cycle crankcase compression internal combustion engine of claim 16, wherein the connecting rod is formed with an opening aligned with the piston opening for lubricant flow to the piston pin and its bearing.

18. The two cycle crankcase compression internal combustion engine of claim 17, wherein the cylinder opening and connecting rod small end openings are disposed at a right angle to the axis of the piston pin.

19. A two cycle crankcase compression internal combustion engine having a cylinder block defining a cylinder bore, a crankcase chamber formed at one end of said cylinder bore, a piston reciprocating in said cylinder bore, a connecting rod connected at one end to said piston and at another end to a crankshaft journalled for rotation in said crankcase chamber, said piston having an opening in its outer surface aligned with said one end of said connecting rod, a lubricant supply passage formed within said cylinder and opening into said cylinder bore at a position aligned with said piston opening during at least a portion of its stroke for delivering lubricant to said connecting rod one end, and means for also supplying air through said cylinder opening to said piston opening.

20. The two cycle crankcase compression internal combustion engine of claim 16, further including an atmospheric air inlet for supplying air to the cylinder opening.

21. The two cycle crankcase compression internal combustion engine of claim 20, wherein the cylinder opening forms a portion of the induction system for the engine for delivering an air charge to the crankcase chamber.

22. The two cycle crankcase compression internal combustion engine of claim 21, wherein the means for providing lubricant comprises a separate lubricant pump for supplying lubricant directly to the cylinder opening.

23. The two cycle crankcase compression internal combustion engine of claim 21, wherein the means for supplying lubricant comprises means for draining lubricant from the crankcase chamber and supplying it to the cylinder opening.

* * * * *